Feb. 13, 1951  E. A. WEISS ET AL  2,541,391
TRANSMISSION MECHANISM
Filed March 19, 1945  3 Sheets-Sheet 3
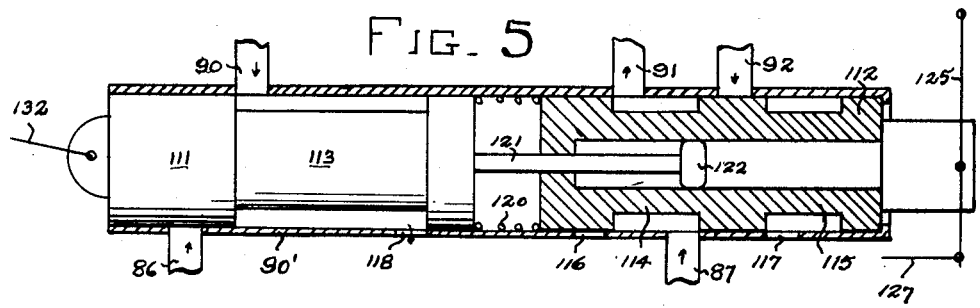
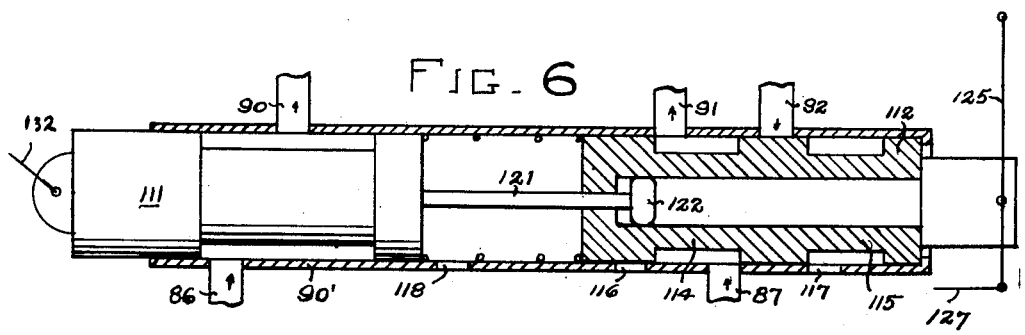
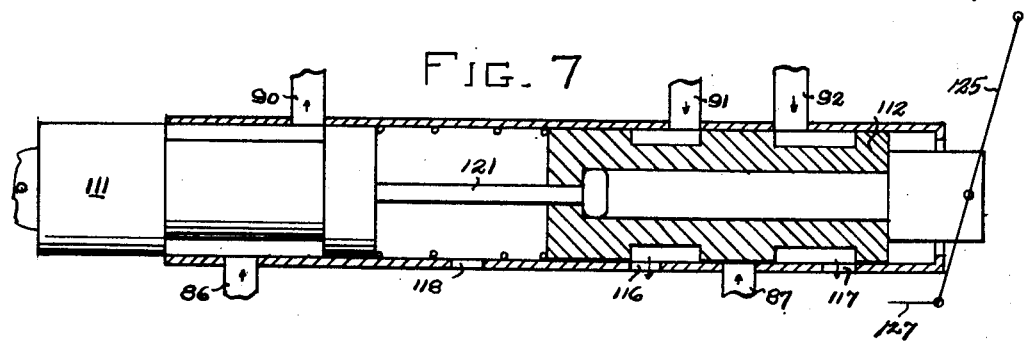
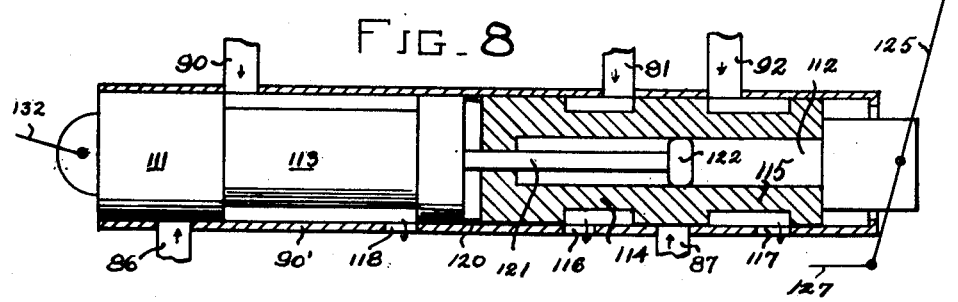
INVENTORS
Erwin A. Weiss
and
LeRoy H. Frailing
BY
Tibbetts & Hart
ATTORNEYS Patented Feb. 13, 1951

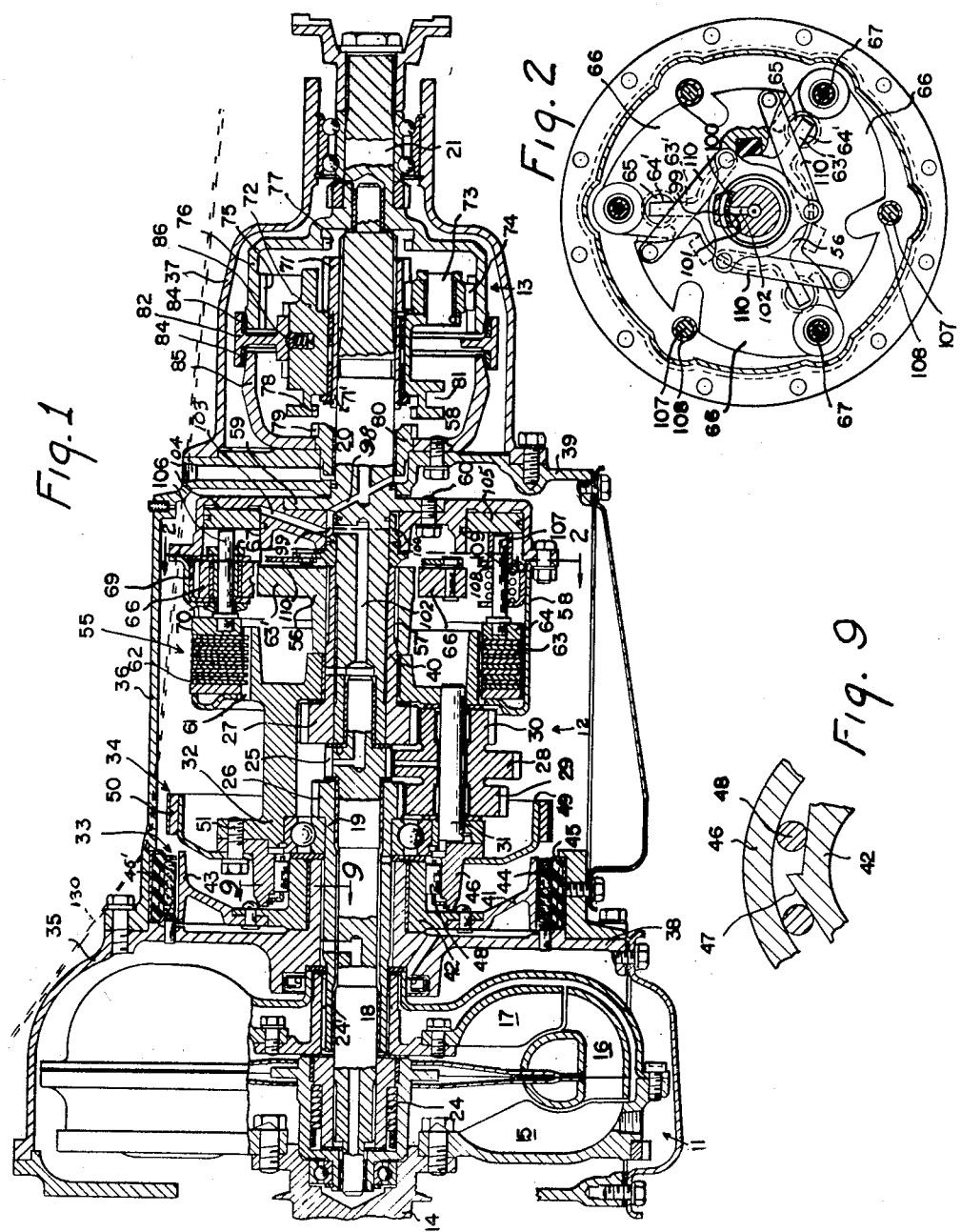

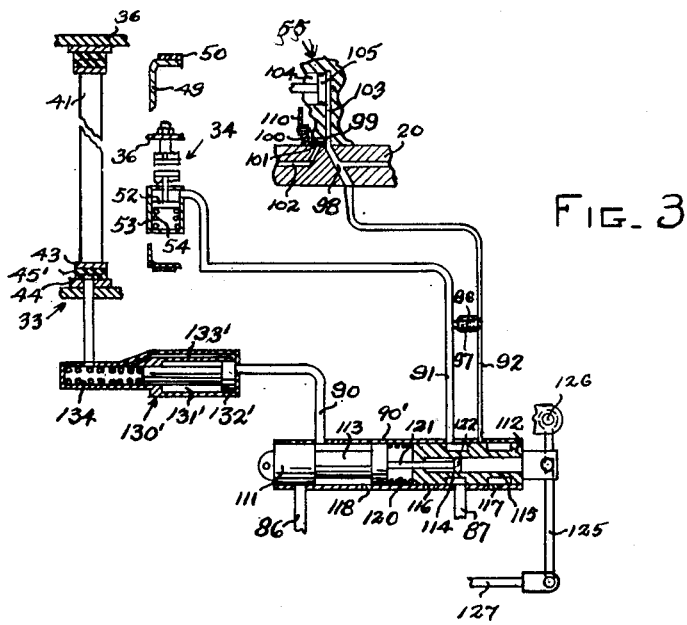
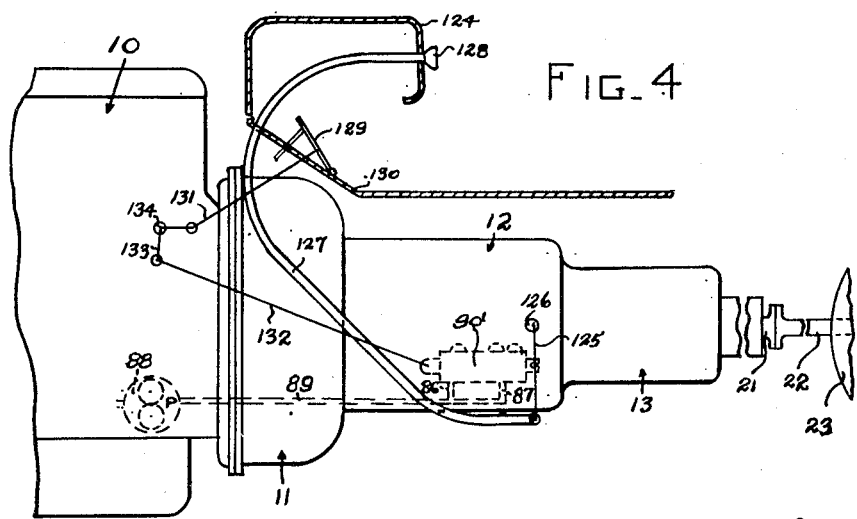

2,541,391

UNITED STATES PATENT OFFICE 2,541,391

TRANSMISSION MECHANISM

Erwin A. Weiss and Le Roy H. Frailing, Detroit, Mich., assignors to Packard Motor Car Company, Detroit, Mich., a corporation of Michigan Application March 19, 1945, Serial No. 583,458

11 Claims. (Cl. 74—472)

This invention relates to transmission mechanism and is especially adapted for use with motor vehicles.

One object of the invention is to provide transmission mechanism for motor vehicles having planetary gearing that may be automatically controlled to provide several driving speeds in accordance with driving requirements.

Another object of the invention is to provide a fluid coupling driven change speed mechanism for motor vehicles that is automatically conditioned to crank a dead engine when the vehicle is pushed.

Another object of the invention is to provide transmission mechanism including planetary gearing, automatically adjustable for different driving speeds, with a control that can be operated at will to establish a fixed drive ratio.

Another object of the invention is to provide a control mechanism operable to influence the drive through planetary gearing to meet the various driving conditions encountered by motor vehicles.

Other objects of the invention will appear from the following description taken in connection with the drawings, which form a part of this specification, and in which:

Fig. 1 is a longitudinal sectional view of transmission mechanism incorporating the invention;

Fig. 2 is a sectional view taken on line 2—2 of Fig. 1 showing the torque-speed drive and control device for the clutch means;

Fig. 3 is a schematic sectional view of a portion of the hydraulic control for the gearing;

Fig. 4 is a side elevational view of a motor vehicle chassis showing the transmission mechanism and controls;

Figs. 5 to 8 inclusive are sectional views of the control valve device showing the various positions of adjustment for obtaining different driving conditions with the transmission mechanism.

Fig. 9 is a sectional view taken on line 9—9 of Fig. 1 showing the one-way brake for the planetary gearing.

Referring to the drawings by characters of reference, the power transmission mechanism comprises generally internal combustion engine 10, fluid coupling 11, planetary gearing 12 and forward and reverse drive selector mechanism 13.

The engine crankshaft 14 is fixed to the fluid coupling impeller 15 and the fluid coupling has two runners 16 and 17 associated with drive shafts 18 and 19 for driving the planetary gearing. The planetary gearing is connected to actuate driven shaft 20 from which the forward and reverse mechanism transmits rotation to the tail shaft 21. The tail shaft is connected to propeller shaft 22 for operating a conventional drive axle (not shown) for the vehicle drive wheels, one of which is indicated by numeral 23 (Fig. 4). Runner 16 is drivingly connected with shaft 18 by a spring type overrunning clutch 24 while runner 17 is splined at 24' to shaft 19.

The planetary gearing includes drive gear 25 fixed to rotate with shaft 18, drive gear 26 fixed to rotate with shaft 19 and driven gear 27 is connected with shaft 20 by means described hereinafter. Planet gear 28 meshes with gear 25, planet gear 29 meshes with gear 26 and planet gear 30 meshes with gear 27. These planet gears may be formed separately and fixed together or they may be formed in spool gears as shown, but in either event they are rotatably mounted on pins 31 fixed to carrier 32. The ratios of the meshing pairs of gears 26, 29 and 25, 28 are such that the drive through each pair is different. Fluid in the coupling or clutch 11 is circulated by impeller 15 first through runner 16 and then runner 17 in series. The shaft 18 will first be driven through clutch 24 to provide low speed drive through gears 25, 28 and as the impeller speed picks up the second runner 17 will drive shaft 19 and through gears 26, 29 will take over the drive at a higher speed. As the planet pinions are integral, shaft 18 will be driven through the gearing from shaft 19 at a speed that will cause it to overrun runner 16. The planetary gearing will be ineffective to drive through the pairs of gears unless the carrier is held to prevent retrograde rotation and two brake means 33 and 34 are provided for this purpose.

The fluid coupling 11, gearing 12 and selector mechanism 13 are housed in a casing comprised of sections 35, 36 and 37. Casing section 35 encloses the fluid coupling and is fixed to the engine 10, casing section 36 encloses the change speed gearing 12 and casing section 37 encloses the selector mechanism. The rear wall 38 of casing section 35 serves to support the drive shafts 18 and 19 while the rear wall 39 of casing section 36 serves to support shaft 20 which pilots in shaft 40 fixed to and extending rearwardly from gear 27. Carrier 32 is rotatably mounted around shafts 19 and 40.

Brake means 33 is designed to prevent retrograde rotation of the planetary gearing carrier. Brake drum 41 has a hub 42 and a rim 43 adapted to be engaged or released by sectional band 44 mounted in carrier 45 fixed to casing 36. Within the carrier is a rubber tube 45' for receiving fluid whereby it will expand and engage the band with the drum. Carrier 32 has an end ring flange 46 overlying a portion of the brake hub on which are formed cam faces 47 (Fig. 9) and rollers 48 are assembled between such faces and the carrier flange. Such structure provides a one-way brake or torque reaction abutment for the carrier when the band 44 is engaged preventing retrograde rotation of the carrier. When the band 44 is released, the drum is free to rotate in either direction with the carrier 32.

The other brake means for the carrier 32 comprises a drum 49 and sectional brake band 50, the drum being secured to the carrier by bolts 51 which also secure flange 46 to the main portion of the carrier. The band (Fig. 3) is suitably anchored at one end to the casing 36 and the other end of the band is engaged by actuator means 52 in the form of a piston arranged in housing 53 fixed to casing 36 and acted against by spring 54 to normally engage the band on the drum 49. The band is released by fluid pressure acting against the piston to bias the spring. Application of the band will prevent rotation of the carrier forwardly or rearwardly whereby the planetary gearing is conditioned for either first or second speed drives as dictated by the fluid coupling drive in response to vehicle operating conditions.

Third speed or direct drive through the planetary gearing is obtained by locking two elements of the gearing so that it will rotate as a unit. This drive is obtained by clutch means 55 locking the carrier 32 to shaft 20 through clutch housing 58 secured to flange 59 on shaft 20 by bolts 60. Carrier 32 is slotted at 61 and housing 58 has slots 62 for receiving alternate clutch plates 63 and a pressure ring 64 is actuated to engage the clutch plates to establish direct drive.

The connection between shaft 40 carrying driven gear 27 and shaft 20 comprises a torque-speed control device between the spider 56 and the clutch housing 58. The spider is splined at 57 to shaft 40 and has arms 63' slidably mounted in slots 64' formed in cylindrical members 65 rotatably mounted in weight members 66. The weight members are rotatably mounted on sleeve members 67 extending through the flanges of a U-shaped circular bracket 69 fixed to clutch housing 58. The sleeve members 67 are retained by nuts 70. In first and second speed, the drive passes from shaft 40 through spider 56, arms 63', members 65, weight members 66, sleeve members 67, bracket 69 and clutch housing 58 to driven shaft 20.

Selector mechanism provides the driving connection between driven shaft 20 and tail shaft 21. Sun gear 71 is slidably splined on shaft 20 and carrier 72 is mounted on the sun gear sleeve 71' and fixed in an axial direction therewith. Pins 73 are fixed to the carrier and planet gears 74 are rotatably mounted thereon in mesh with gear teeth 75 formed internally on the enlarged hollow end 76 of shaft 21. This enlarged end of shaft 21 also has clutch teeth 77 which sun gear 71 may be shifted to engage to establish forward drive. The carrier is formed with clutch teeth 78 that may be engaged with teeth 79 on clutch element 80 fixed to wall 39 of the casing to provide reverse drive. Carrier 72 has a groove 81 for receiving a conventional shifter fork (not shown) adapted to be manually actuated.

Gear 71 and carrier 72 are shifted axially as a unit and synchronizer mechanism is provided to prepare the selector mechanism for forward and reverse drive engagement. Ring member 82 is slidably splined on carrier 72 and has a rim carrying brake rings 84. These brake rings are adapted to engage the enlarged end 76 of the shaft 21 or a drum 85 fixed to wall 39. Ring member 82 is restrained from axial movement relative to the carrier by spring pressed plungers 86 so that the carrier rotation is stopped by a band 84 before teeth 78 can engage teeth 79 or the carrier is rotating with the shaft 21 by application of a band 84 before gear 71 can engage with teeth 77. The selector mechanism can be manually located in neutral position as shown in Fig. 1, in forward drive relation by engaging gear 71 with teeth 77 or in reverse position by engaging teeth 78 with teeth 79.

Brake means 33 and 34 and clutch means 55 are controlled by a hydraulic system and the hydraulic system is controlled manually and by the torque-speed device. The hydraulic system may be a part of the transmission and engine lubricating system. An engine driven pump 88 (Fig. 4) draws oil from the engine sump and feeds it through passage 89 and branches 86, 87 to valve housing 90'. Passages 90, 91 and 92 lead from the valve housing respectively to brake means 33, brake means 34 and clutch means 55. Passages 91 and 92 are interconnected by passage 96 in which a spring seated valve 97 is arranged that opens toward the clutch passage. Passage 91 connects with housing 90' in relation for fluid pressure to move the piston actuator 52 to brake releasing position. Passage 90 leads to the interior of tube 45' and passage 92 leads to shaft 20 where it connects with passage 98 leading to chamber 99 in which is arranged a sleeve valve 100 having a passage 101 that may be opened or closed to passage 102 in shaft 20 leading to bearings in the planetary change speed gearing. Passage 103 in the clutch housing 55 leads from chamber 99 to chamber 104 in which piston 105 may shift to actuate pins 106 fixed to pressure ring 64. Three of these pins extend through the sleeve members 67 on which the weights 66 are mounted. Three other pins 107 are fixed to the clutch pressure ring and project through sleeves 108 held against the piston 105 by springs 109 anchored on ring 69. These springs and sleeves act to return the piston to clutch disengaging position and the associated pins prevent cocking or distortion of the piston.

Valve 100 is connected to the torque-speed responsive weights 66 by links 110. As the weights swing inwardly or outwardly they will shift the links to oscillate the valve and thereby control fluid flow to chamber 104 and thereby automatically cause engagement or disengagement of the clutch 55.

Fluid flow through housing 90' is controlled by a manually operable compound valve device consisting of two sections 111 and 112. Section 111 has a reduced diameter portion 113 providing a chamber in housing 90' and is shiftable to open or close passage 90 to passage 86 or to open or close passage 90 to drain opening 118. Valve section 112 has two reduced diameter portions 114 and 115 providing chambers in the valve casing. The reduced diameter portion 114 may open or close passage 87 relative to passage 91 or to the drain opening 116 and the portion 115 may open or close passage 92 to the drain opening 117.

The valve sections 111 and 112 are spaced axially by coil spring 120 and section 111 has a stem 121 extending through the adjacent end of section 112. The stem terminates in a head 122 that is axially movable and confined in an axial bore in section 112.

Valve section 112 is actuated manually by mechanism extending preferably to the vehicle dash 124. Lever 125 is connected to an end of the valve section 112 projecting beyond the casing and one end is pivotably mounted at 126 to a stationary part of the vehicle. A Bowden wire 127 is connected to the other end of the lever and extends through the dash and terminates in knob 128.

Valve section 111 is operated manually by mechanism connected to the engine throttle valve control pedal 129 anchored to the vehicle floor 130. This mechanism includes link 131 connected to the accelerator pedal, link 132 connected to valve section 111 and bell crank 133 connected to the links and anchored at 134 to a stationary part of the vehicle.

The fluid pressure in the hydraulic system is some predetermined amount, such as 60 pounds, which is sufficient for controlling brake means 34 and clutch means 55 but insufficient for brake means 33 where the torque reaction is taken when driving in first and second speed. In order to step up this pressure, a booster device 130' is arranged in passage 90. The booster device housing has a two diameter chamber 131' in which a two diameter piston 132' operates and fluid from the pump moves into the housing against the larger diameter portion of the piston. The housing contains a passage 133' shunting the larger diameter chamber to establish communication between the chambers and a coil spring 134 in the smaller diameter chamber exerts pressure against the smaller diameter end of the piston. As the piston is moved by fluid pressure, the piston will close passage 133' shutting off communication between the ends of the chamber. Due to the difference in area of the ends of piston, fluid pressure beyond the small end of the piston will be increased beyond that of fluid passing through the main control valve.

The selector valve device for controlling fluid flow to brake means 33, 34 and clutch 55 is shown in neutral position in Fig. 5, the accelerator pedal being in released position for engine idling. Valve section 111 shuts off flow to the one-way brake means 33 from passage 86 and opens vent 118, and valve section 112 opens passage 87 to passage 91 so that fluid flows to disengage brake band 50. The carrier is rotated in a retrograde direction and the change speed gearing will idle so long as clutch 55 does not become engaged. This condition exists even though the selector mechanism is shifted into forward or reverse position. Thus when the vehicle is standing still with the engine idling, the selector mechanism 113 can be engaged and the drive will be broken through the change speed gearing so that there will be no creep resulting from fluid coupling operation. This condition allows the vehicle to start forwardly or rearwardly, at a stop light for example, by depressing the accelerator to move valve section 111 into the position shown in Fig. 6 whereby fluid can flow from passage 86 to passage 90 to engage the one-way brake means 33.

Valve section 112 remains in the same position for the automatic shifting of the gearing in neutral, first, second and third speeds, as shown in Figs. 5 and 6. In first, second and third speeds, the valve section 111 is moved by the depression of the accelerator pedal, between idling and wide open throttle position, to open passage 86 to passage 90 so that the one-way brake means 33 will be applied. Such brake means is effective only in first and second speeds. Valve section 112 will open passage 87 to 91 to release brake means 34 in all three speeds. The one-way brake means prevents retrograde movement of the planetary carrier 32 so that either first or second speed drive will be effective, depending on operating conditions reflected in the fluid coupling, when the torque-speed value is below that making clutch means 55 effective.

Below such predetermined torque-speed value fluid flowing through passages 91 and 96 to passage 92 will escape through passage 101 in the torque-speed controlled valve 100 to passage 102 so that clutch means 55 will not be engaged by fluid pressure. Above such predetermined torque-speed value valve 100 will be shifted by the torque-speed device to shut off fluid flow through passage 102 so that fluid will flow through passage 103 to chamber 104 moving the clutch actuators 105 and 106 to engage clutch means 55. Such clutch engagement will lock shaft 20 to carrier 32 so that the planetary gearing and shafts 18 and 19 will rotate as a unit providing high speed drive. Passages 90 and 91 will be open to fluid flow so that brake means 34 will be disengaged and brake means 33 engaged. The carrier 32 will overrun the brake means 33 so that its engagement will not interfere with high speed drive and it will be conditioned for first and second speed drive when the torque-speed device operates to disengage clutch means 55.

Provision is made for overruling the torque-speed device to shift the drive from high speed to second speed although high speed is dictated by the control. This is accomplished by depressing the accelerator beyond wide open throttle position to shift valve section 111 which through means of head 122 will shift valve section 112 to the position shown in Fig. 7 thereby shutting off fluid flow to the clutch device 55 and making brake means 33 effective to prevent retrograde rotation of carrier 32. This lower speed drive will be maintained so long as the accelerator pedal is depressed beyond wide open throttle position but when the pedal is released to throttle valve adjusting range the valve section 111 will be shifted to release valve section 112 so that spring 120 will return it to high speed position whereby fluid can flow to engage clutch means 55 if the torque-speed controlled valve is still closed. The vehicle drive can thus readily be shifted back and forth between second speed and high speed by operation of the accelerator pedal.

Provision is also made for controlling the planetary gearing for positive second speed drive which is desirable when the vehicle is going down hill and the engine is needed as a brake. The vehicle driver pulls knob 128 rearwardly shifting valve section 112 to the position shown in Fig. 8 so the fluid flow is shut off to brake means 34 and clutch means 55. Spring 54 will now operate the actuator 52 to engage band 50 with drum 49 so that carrier 32 will be held stationary regardless of other control conditions. Passage 91 is now open to drain port 116 and passage 92 is open to drain port 117 so the clutch means 55 cannot be engaged and brake means 34 cannot be disengaged by fluid pressure.

Brake band 50 must be disengaged when brake means 33 is engaged for first and second speed drive. The check valve 97 will prevent fluid flow from passage 91 to passage 92 below a pressure sufficient to permit disengagement of brake band 50 by spring 54 when the torque-speed valve 100 opens passage 92 to drain passage 102.

When there is no pressure in the hydraulic control system, spring 54 acts to engage brake 50 to hold carrier 32 stationary so that the engine will be driven or cranked through the transmission when the vehicle is pushed for starting.

It will be understood that various forms of the invention other than that described above may be used without departing from the spirit or scope of the invention.

What is claimed is:

1. In a vehicle transmission mechanism, engine throttle valve control means, a drive shaft, a driven shaft, planetary gearing connecting said shafts, clutch means controlling the gearing to provide high driving speed when engaged, brake means operative to condition the gearing for low speed drive when engaged, a fluid pressure system for operating the brake means and the clutch means, a valve device in the system operative to control fluid flow to the clutch means and the brake means, valve means responsive to torque and speed of the driven shaft for shunting fluid flow from the clutch means below predetermined vehicle operating values, and means actuated by said throttle control means for controlling the valve device to shunt the fluid flow from the clutch means above said predetermined vehicle operating values at the will of the operator.

2. In a vehicle transmission mechanism, engine throttle valve control means, a drive shaft, a driven shaft, planetary gearing connecting said shafts, clutch means for controlling the gearing to provide high driving speed when engaged, an overrunning brake means operative to prevent retrograde rotation of an element of said gearing when engaged, brake means for preventing rotation of an element of said gearing in either direction, a fluid pressure system connected with both said brake means and said clutch means, a sectional valve device controlling fluid flow to condition said brake means and said clutch device, and means manually operable to shift sections of said valve device and selectively control the brake means and the clutch means.

3. In a transmission mechanism, a casing, a pair of fluid clutch operated drive shafts, a driven shaft, planetary gearing in the casing having a carrier and gears of different ratio driven by the drive shaft and geared to the driven shaft, two brakes anchored to the carrier, an overrunning clutch between the carrier and one of the brakes, spring means normally engaging the other brake with the carrier, a fluid pressure system connected with said brakes, a compound valve device having relatively movable sections, one section controlling flow in the system to one brake and another section controlling flow in the system to the other brake, and means for actuating the sections together or separately.

4. In a transmission mechanism, a casing, a drive shaft, a driven shaft, planetary gearing connecting said shafts, said gearing having a freely rotatable carrier, clutch means for locking the carrier and one element of the gearing, an overrunning brake means engageable with the carrier, a brake band for one element of the overrunning brake means anchored to the casing, a fluid pressure system connected to operate the brake means and the clutch means, a control valve in the system operable to selectively engage the clutch means or the brake means, and fluid pressure booster means in the system between the valve and the brake means.

5. In a vehicle transmission mechanism, a drive shaft, a driven shaft, planetary gearing geared to said shafts and having a carrier, brake means normally holding the carrier stationary, a clutch means for locking the carrier with another element of the planetary gearing, a fluid pressure system having a passage through which fluid flows to disengage the brake means and another passage interconnected with the brake means passage through which fluid flows to engage the clutch means, a pressure relief valve at the interconnection between said passages and opening toward the clutch means passage, valve means for opening or closing the passage for the brake means in advance of the interconnection between said passages, and means for venting the clutch means below predetermined torque-speed conditions.

6. In a vehicle transmission mechanism, a throttle control accelerator pedal, a drive shaft, a driven shaft, planetary gearing geared to said shafts and including a planet gear carrier, overrunning brake means for preventing retrograde rotation of the carrier, clutch means for locking the planetary gearing, a fluid pressure system for controlling said brake means, a valve device in the system having one section controlling fluid flow to the brake means and another section controlling fluid flow to the clutch device, valve means in the system between the valve device and the clutch means responsive to predetermined torque-speed conditions to control fluid flow to the clutch device, actuator means connecting the valve device section controlling flow to the brake means with the accelerator pedal, means on the brake means control valve device section for moving the clutch means control valve device section to shut off fluid flow to the clutch device when the accelerator pedal is depressed beyond its normal operating range and opening fluid flow to the brake means, and means returning the clutch means control valve device section to open position when the accelerator pedal is returned to its effective throttle valve adjusting range.

7. In a vehicle transmission device, an accelerator pedal, a drive shaft, a driven shaft, planetary gearing geared to said shafts and including a carrier, a one-way brake means for the carrier, a two-way brake means for the carrier, clutch means for locking the carrier to the driven shaft, a fluid pressure system for engaging the one-way brake means and the clutch means and disengaging the two-way brake means, a valve device in the system having two sections movable to control fluid flow to both brake means and the clutch means, an actuator connection between one section of the valve device and the accelerator for controlling fluid flow to the one-way brake means, an interconnecting means on said accelerator pedal actuated valve device section for operating the other valve device section controlling flow to the two-way brake means and the clutch means when the pedal is depressed beyond its normal operating range, and means operable at will for shifting the valve device section controlling flow to the two-way brake means and the clutch means.

8. Control means for change speed gearing having a drive and driven shaft connected by planetary gearing including a carrier, brake means for the carrier, clutch means for locking the gearing, a hydraulic system connected with said brake means and said clutch means, a two section valve device in the system, one of said sections controlling fluid flow to the brake means and the other section controlling flow to the clutch means, speed responsive valve means in the system between the valve device and the clutch means, and means for operating the valve sections together and separately.

9. Control means for change speed gearing having a drive shaft, driven shaft and planetary gearing geared to said shafts including a carrier, comprising clutch means for locking the gearing to obtain one driving speed, self-engaging brake means for holding the carrier from rotation to provide another driving speed, a hydraulic system operable to disengage the brake means and to engage the clutch means, said system including interconnected fluid passages leading from a common feed passage, a valve device controlling flow through the common passage, a speed responsive valve in the passage leading to the clutch means controlling flow to the clutch, and means preventing flow of fluid from the feed passage for the clutch means to the feed passage for the brake means.

10. In a vehicle transmission device, a drive shaft, a driven shaft, planetary gearing including a carrier and gears connecting said shafts, brake means for preventing rotation of said carrier, clutch means for locking the carrier with the driven shaft, and a fluid system controlling said brake means and said clutch means and including a fluid passage leading to said clutch means, a device for opening and shunting the fluid flow through said passage to and from said clutch means, a fluid passage leading to said brake means, a fluid connection between said passages, and a valve in said connection permitting fluid flow through said first mentioned passage and maintaining sufficient fluid pressure in said second passage to effect engagement of the brake means when the fluid pressure is shunted from the clutch means.

11. In a vehicle transmission device, a drive shaft, a driven shaft, planetary gearing including a carrier and gears connecting said shafts, brake means for preventing rotation of said carrier, clutch means for locking the carrier with the driven shaft, and a fluid system controlling said brake means and said clutch means and including a fluid passage leading to said clutch means, a device for opening and shunting the fluid flow through said passage to and from said clutch means, a fluid passage leading to said brake means, a fluid connection between said passages, a valve in said connection permitting fluid flow through said first mentioned passage and maintaining sufficient fluid pressure in said second passage to effect engagement of the brake means when the fluid pressure is shunted from the clutch means, and means operable at will for shunting off the fluid flow through both of said passages.

ERWIN A. WEISS.
LE ROY H. FRAILING.

REFERENCES CITED

The following references are of record in the file of this patent:

UNITED STATES PATENTS

| Number | Name | Date |
|---|---|---|
| 1,609,782 | Small et al. | Dec. 7, 1926 |
| 2,100,810 | Livermore | Nov. 30, 1937 |
| 2,120,104 | Livermore | June 7, 1938 |
| 2,123,430 | Kuehnel | July 12, 1938 |
| 2,171,534 | Banker | Sept. 5, 1939 |
| 2,193,305 | Thompson | Mar. 12, 1940 |
| 2,193,317 | Flogaus et al. | Mar. 12, 1940 |
| 2,237,864 | Fawick | Apr. 18, 1941 |
| 2,339,626 | Duffield | Jan. 18, 1944 |
| 2,343,955 | Cotterman | Mar. 14, 1944 |